US010073896B2

(12) United States Patent
Park et al.

(10) Patent No.: US 10,073,896 B2
(45) Date of Patent: Sep. 11, 2018

(54) SYSTEM AND METHOD FOR PROVIDING NEARBY SEARCH SERVICE USING POI CLUSTERING SCHEME

(71) Applicant: Thinkware Corporation, Seongnam-si, Gyeonggi-do (KR)

(72) Inventors: Hyo Jeong Park, Suwon-si (KR); Won Dal Jang, Seongnam-si (KR); Jeong Han Son, Seongnam-si (KR); Dong Jin Yoon, Hanam-si (KR); Hye Lim Yu, Seoul (KR)

(73) Assignee: Thinkware Corporation, Seongnam-si (KR)

(*) Notice: Subject to any disclaimer, the term of this patent is extended or adjusted under 35 U.S.C. 154(b) by 305 days.

(21) Appl. No.: 14/940,501

(22) Filed: Nov. 13, 2015

(65) Prior Publication Data
US 2016/0267149 A1  Sep. 15, 2016

(30) Foreign Application Priority Data

Mar. 13, 2015  (KR) .................. 10-2015-0035301
Jun. 2, 2015   (KR) .................. 10-2015-0078232

(51) Int. Cl.
G06F 17/30   (2006.01)
G06F 3/0481  (2013.01)
G06F 3/0482  (2013.01)

(52) U.S. Cl.
CPC ...... *G06F 17/30554* (2013.01); *G06F 3/0482* (2013.01); *G06F 3/04817* (2013.01); *G06F 17/3053* (2013.01); *G06F 17/3087* (2013.01); *G06F 17/30241* (2013.01); *G06F 17/30601* (2013.01); *G06F 17/30867* (2013.01)

(58) Field of Classification Search
None
See application file for complete search history.

(56) References Cited

U.S. PATENT DOCUMENTS

| 7,562,069 B1* | 7/2009 | Chowdhury | G06F 17/30864 |
| 2009/0119254 A1* | 5/2009 | Cross | G06F 17/30867 |
| 2012/0096410 A1* | 4/2012 | Lancaster | G06F 3/0482 715/854 |
| 2014/0365481 A1* | 12/2014 | Novosel | G06F 17/30864 707/728 |
| 2015/0074072 A1* | 3/2015 | Jain | G06F 17/30696 707/706 |

* cited by examiner

*Primary Examiner* — Son T Hoang
(74) *Attorney, Agent, or Firm* — Fenwick & West LLP

(57) ABSTRACT

A nearby search method implemented with a computer includes verifying search request information entered through an electronic device, displaying a map screen on a screen of the electronic device, verifying a search result to be displayed on the map screen according to the verified search request information, dividing the map screen into a plurality of tiles, and displaying a search result, included in each of the divided tiles, as one search result icon corresponding to each of the divided tiles and distinguishably displaying search result icons to be displayed on each of the divided tiles according to the number of search results included in one tile.

15 Claims, 13 Drawing Sheets

SYSTEM AND METHOD FOR PROVIDING NEARBY SEARCH SERVICE USING POI CLUSTERING SCHEME

CROSS-REFERENCE TO RELATED APPLICATIONS

A claim for priority under 35 U.S.C. § 119 is made to Korean Patent Application No. 10-2015-0035301 filed Mar. 13, 2015, and Korean Patent Application No. 10-2015-0078232 filed Jun. 2, 2015, in the Korean Intellectual Property Office, each of which are hereby incorporated by reference in its entirety.

BACKGROUND

Embodiments of the inventive concepts described herein relate to search technologies, and more particularly, to systems and methods for providing nearby search services.

It is difficult to meet various search conditions of a user using nearby searches of a currently served application (hereinafter, referred to as an 'app') of a smartphone. Also, when the user wants to search for a business type, such as a downtown area or a restaurant/café, having high density, it is difficult to select a point of interest (POI) he or she wants to see.

Since positions of search results are more overlapped in an area having high density, some search results may not displayed. Also, when all of search results are displayed, it is difficult to select a POI the user wants through a conventional user interface.

Also, multiple business type searches may not be performed using a current nearby search function. For example, when the user wants to search for a restaurant, he or she may search for only the restaurant. When the user wants to search for a gas station, he or she may search for only the gas station. In other words, in the related art, one business type search is performed. Specifically, when the user has a plan to fill up his or her car at a gas station, has a meal in a restaurant, and takes a cup of tea around a current position, it is likely that the number of nearby searches will be three or more. Therefore, in the related art, it is difficult to satisfy various purposes of the user since only one business type search may be performed. Also, since a joint search between a business type and a title is not provided, when the user knows a part of a title and when he or she does not know an accurate business type of a covered place, it is difficult to find a destination he or she wants. For example, Korean Patent Laid-open Publication No. 10-2007-0105642 relates to a navigation system for providing a business type search service and a navigation providing method therefor and discloses technologies of identifying a business type requested to search for and providing position information of the identified business type.

SUMMARY

Embodiments of the inventive concepts provide a system and method for providing density of search results such that users may recognize the density of the search results at a glance, using a point of interest (POI) scheme.

Embodiments of the inventive concepts provide a system and method for providing a user interface which may easily and conveniently select a POI a user easily see on a map and wants when search results are overlapped with each other.

Embodiments of the inventive concepts provide a system and method for performing a joint search between a business type and a title, a user wants, and supporting multiple business type searches.

One aspect of embodiments of the inventive concept is directed to provide a nearby search method implemented with a computer. The nearby search method may include verifying search request information entered through an electronic device, displaying a map screen on a screen of the electronic device, verifying a search result to be displayed on the map screen according to the verified search request information, dividing the map screen into a plurality of tiles, and displaying a search result, included in each of the divided tiles, as one search result icon corresponding to each of the divided tiles and distinguishably displaying search result icons to be displayed on each of the divided tiles according to the number of search results included in one tile.

The distinguishably displaying of the search result icons may include distinguishably displaying the search result icons, when the number of the search results included in the one tile is more increased, such that a size of a corresponding search result icon becomes bigger.

The nearby search method may further include previously setting a plurality of grades for the search result icons according to a range of the number of the search results included in the one tile. The distinguishably displaying of the search result icons may include distinguishably displaying the search result icons such that a search result icon of a relatively higher grade has a relatively bigger size.

Each of the search result icons may include an indicator indicating the number of search results included in a corresponding tile.

The nearby search method may further include further displaying a selection user interface on a fixed position of the map screen, moving and displaying a map on the map screen according to an input of a user, and when a search result icon displayed on the map screen is moved within a region of the selection user interface according to the movement of the map, providing additional information about a search result corresponding to the search result icon moved within the region of the selection user interface.

The search result may be classified and managed according to N (N is a natural number of 2 or more) categories. The verifying of the search request information may include providing a user interface, which select M (M is a natural number of N or less) of N categories, to the electronic device and verifying search request information including the M categories selected through the user interface.

The search request information may include a plurality of categories selected through a user interface. The verifying of the search result may include verifying a search result corresponding to each of the plurality of selected categories. When categories of the search results included in the one tile are different from each other, a category icon of a category having relatively more search results of the same category may be included in a search result icon corresponding to the one tile.

The search request information may include a plurality of categories selected through a user interface. The verifying of the search result may include verifying a search result corresponding to each of the plurality of selected categories. When the search results included in the one tile correspond to a plurality of categories, a plurality of category icons corresponding to the plurality of categories may be included in a search result icon corresponding to the one tile.

The search request information may include a plurality of categories selected through a user interface and a keyword entered by a user. The verifying of the search result may include verifying a search result through a joint search using the plurality of selected categories and the keyword.

The nearby search method may further include storing visit history, in which a plurality of electronic devices including the electronic device visit a position corresponding to the search result, in a server. The distinguishably displaying of the search result icons may include receiving the visit history for the search result from the server and displaying the search result icon corresponding to a tile including a search result in which a value according to the visit history is greater than or equal to a predetermined value to be distinguished from the other search result icons.

Another aspect of embodiments of the inventive concept is directed to provide a nearby search system. The nearby search system may include one or more processors. Each of the one or more processors may include a search request information verifying unit configured to verify search request information entered through an electronic device, a map screen display unit configured to display a map screen on a screen of the electronic device, a search result verifying unit configured to verify a search result to be displayed on the map screen according to the verified search request information, a map screen dividing unit configured to divide the map screen into a plurality of tiles, and a search result icon display unit configured to display a search result, included in each of the divided tiles, as one search result icon corresponding to each of the divided tiles and to distinguishably display search result icons to be displayed on each of the divided tiles according to the number of search results included in one tile.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
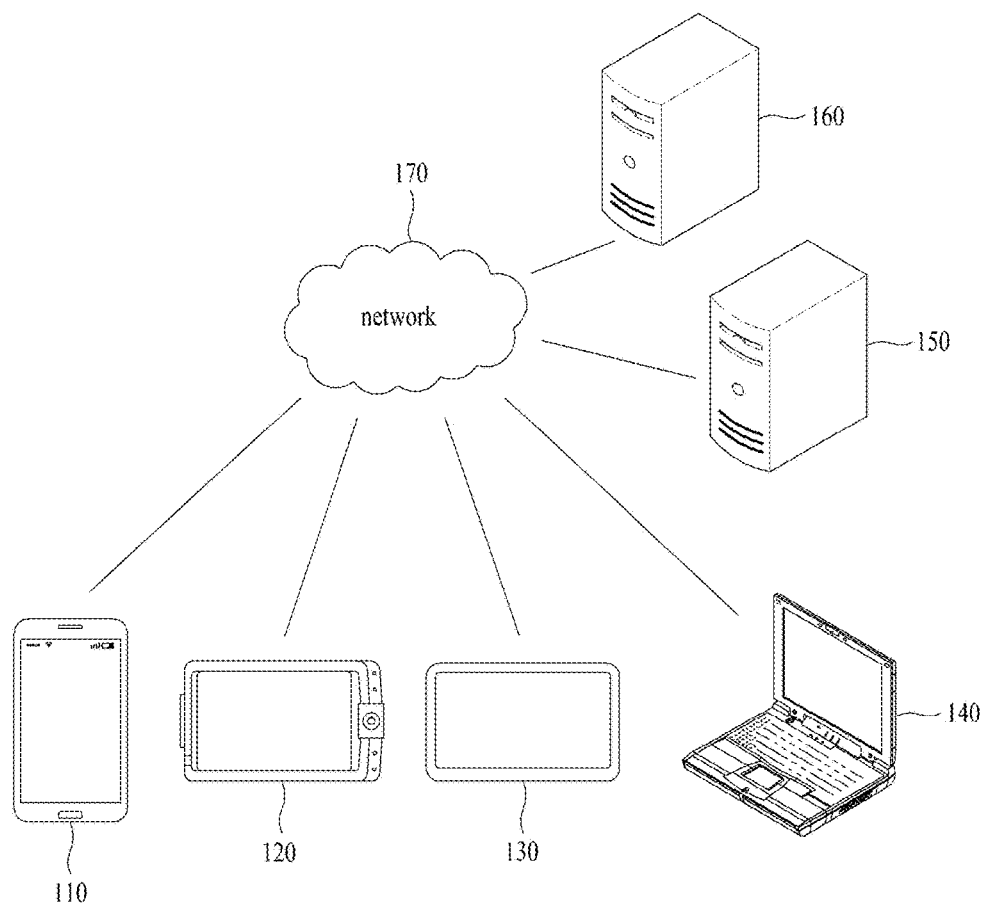
FIG. 1 is a drawing illustrating an operation environment of a nearby search system according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings. However, the inventive concept is not limited by exemplary embodiments. Also, with respect to the descriptions of the drawings, like reference numerals refer to like elements.

FIG. 1 is a drawing illustrating an operation environment of a nearby search system according to an exemplary embodiment of the inventive concept. FIG. 1 illustrates an example in which the operation environment includes electronic devices 110, 120, 130, and 140, servers 150 and 160, and a network 170.

Each of the electronic devices 110, 120, 130, and 140 may be a fixed terminal or a mobile terminal. For example, the electronic devices 110, 120, 130, and 140 may be a smart phone, a mobile phone, a navigation device, a computer, a notebook, a digital broadcasting terminal, a personal digital assistant (PDA), a portable multimedia player (PMP), a tablet personal computer (PC), and the like. These electronic devices 110, 120, 130, and 140 may communicate with other electronic devices and/or the servers 150 and 160 through the network 170 using a wired or wireless communication scheme.

The scope and sprit of the inventive concept may not be limited to the communication scheme. For example, there may be a communication scheme using a local area wireless communication network between devices as well as a communication scheme using a communication network (e.g., a mobile communication network, a wired internet, a wireless internet, and a broadcasting network) which may be included in the network 170. The network 170 may include one or more of networks, such as a personal area network (PAN), a local area network (LAN), a campus area network (CAN), a metropolitan area network (MAN), a wide area network (WAN), a broadband network (BBN), and the Internet. Also, the network 170 may include, but is not limited to, one or more of network topologies which include a bus network, a star network, a ring network, a mesh network, a star-bus network, a tree or hierarchical network, and the like.

Each of the servers 150 and 160 may be implemented with a device or a plurality of devices which may communicate with the electronic devices 110, 120, 130, and 140 through the network 170 and may provide contents for a service. For example, each of the servers 150 and 160 may provide codes, which may configure a screen of each of the electronic devices 110 to 140, according to a request of a user through each of the electronic devices 110, 120, 130, and 140. In an exemplary embodiment of the inventive concept, each of the electronic devices 110, 120, 130, and 140 may provide contents to the user by configuring and displaying its screen according to codes provided using a program included in each of the electronic devices 110, 120, 130, and 140.

In another exemplary embodiment of the inventive concept, each of the electronic devices 110, 120, 130, and 140 may download and store data, necessary for providing a service, in advance through the servers 150 and 160. Each of the electronic devices 110, 120, 130, and 140 may generate content for a service for itself using the stored data and data of each of the electronic devices 110, 120, 130, and 140 and may provide the generated content to the user.

Hereinafter, a description will be given of the one electronic device 110 corresponding to a smartphone according to various exemplary embodiments of the inventive concept. However, the scope and spirit of the inventive concept described herein may be applied to various types of electronic devices, such as a navigation device, a tablet PC, and a notebook.

Figure 2:
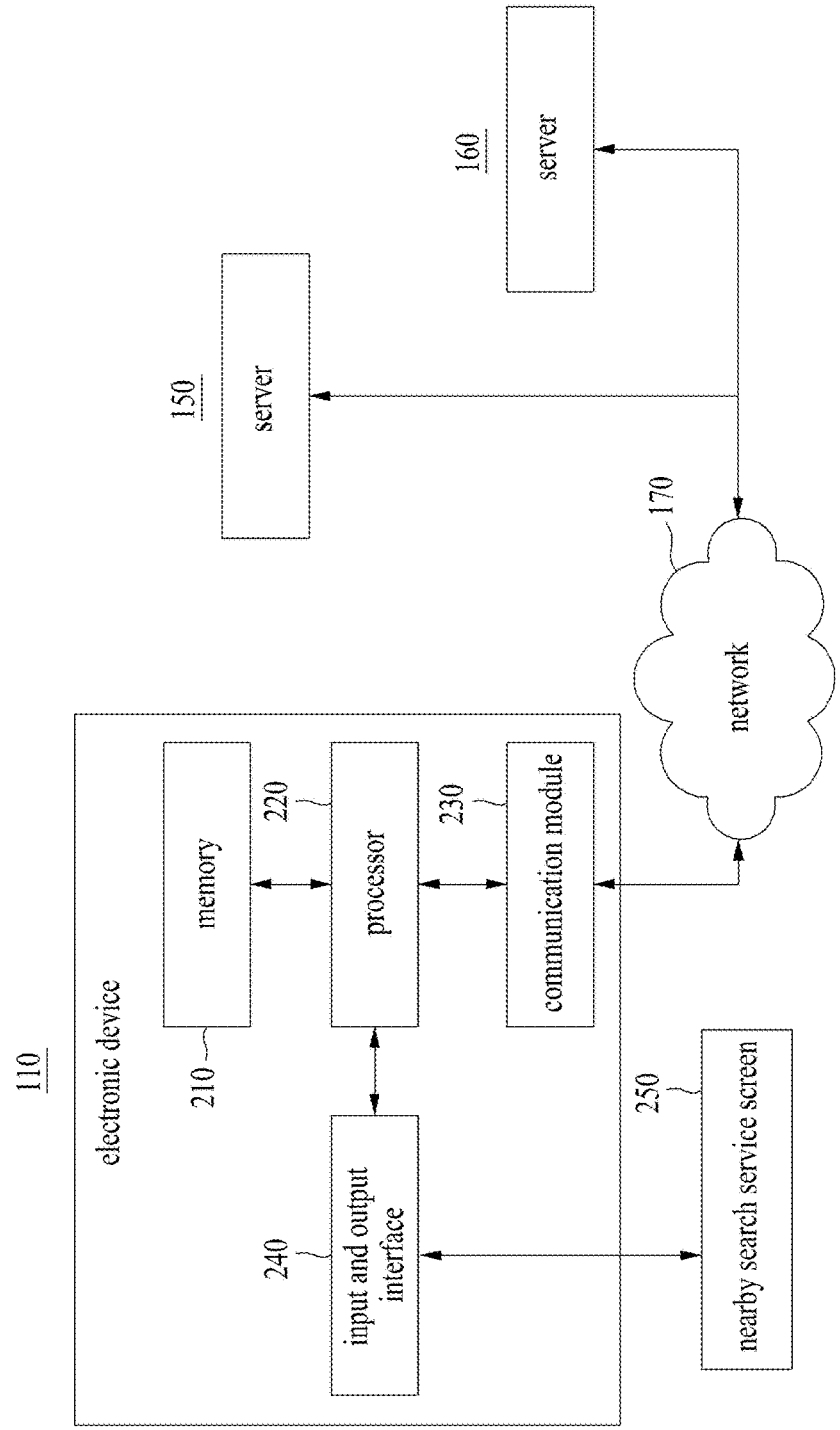
FIG. 2 is a block diagram illustrating a configuration of an electronic device according to an exemplary embodiment of the inventive concept.

FIG. 2 is a block diagram illustrating a configuration of an electronic device according to an exemplary embodiment of the inventive concept. An electronic device 110 may include a memory 210, a processor 220, a communication module 230, and an input and output interface 240. The memory 210 may be a computer-readable storage medium and may include permanent mass storage devices such as a random access memory (RAM), a read only memory (ROM), and a disc drive. Also, the memory 210 may store software components, such as an operating system (OS) and at least one program code. These software components may be loaded from a non-transitory computer-readable storage medium, which is independent of the memory 210, using a drive mechanism. This non-transitory computer-readable storage medium may include non-transitory computer-readable storage media such as a floppy disc, a disc, a tape, a digital versatile disc/compact disc-ROM (DVD/CD-ROM) drive, and a memory card. In another exemplary embodiment of the inventive concept, the software components may be loaded into the memory 210 through the communication module 230, rather than a non-transitory computer-readable storage medium. For example, at least one program may be loaded into the memory 210 according to a program installed by files provided by developers through the network 170.

The processor 220 may be configured to process an instruction of a computer program by performing basic arithmetic, logic, and input and output operations. The instruction may be provided to the processor 220 by the memory 210 or the communication module 230. The processor 220 may be configured to execute a program code stored in a storage device such as the memory 210.

The communication module 230 may provide a function for communicating with another device or the servers 150 and 160 through the network 170. For example, a request message generated by the processor 220 according to a control of user may be transmitted to the servers 150 and 160 through the network 170 according to a control of the communication module 230. In contrast, content provided from the servers 150 and 160 may be received in the communication module 230 through the network 170 and may be then transmitted to the processor 220 or the memory 210.

The input and output interface 240 may provide a function for connecting with input and output devices which may be further included in the electronic device 110 or may be linked with the electronic device 110. The input device may include a mouse, a keyboard, a touch panel, a microphone, and the like. The output device may include a speaker, a display, a touch screen, and the like. For example, a nearby search service screen 250 configured according to the processing of the processor 220 may be displayed on a display connected through the input and output interface 240.

In other exemplary embodiments of the inventive concept, the electronic device 110 may include more components than that of FIG. 2. However, it is unnecessary to describe or illustrate most conventional components in elaborate detail. For example, the electronic device 110 may further include a display, such as a touch screen, and other components, such as a transceiver and a global positioning system (GPS) module.

Figure 3:
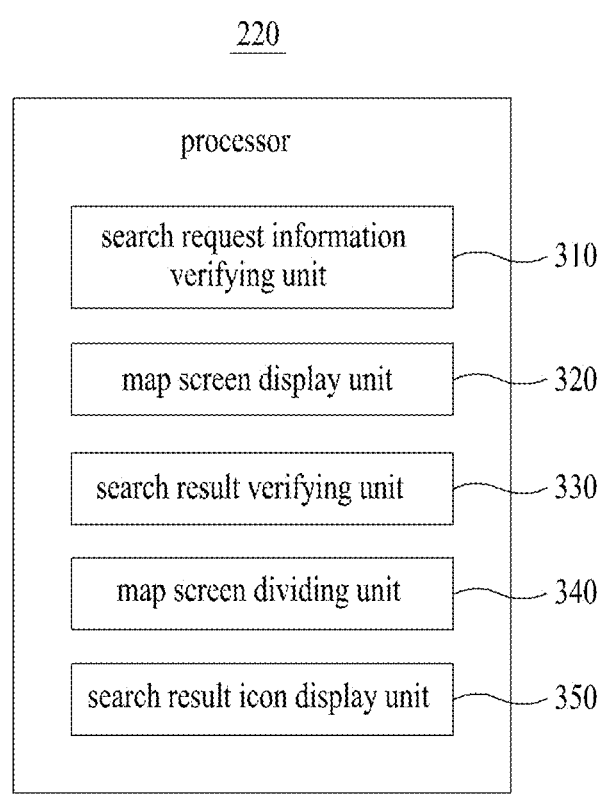
FIG. 3 is a block diagram illustrating a detailed configuration of a nearby search system according to an exemplary embodiment of the inventive concept.
Figure 4:
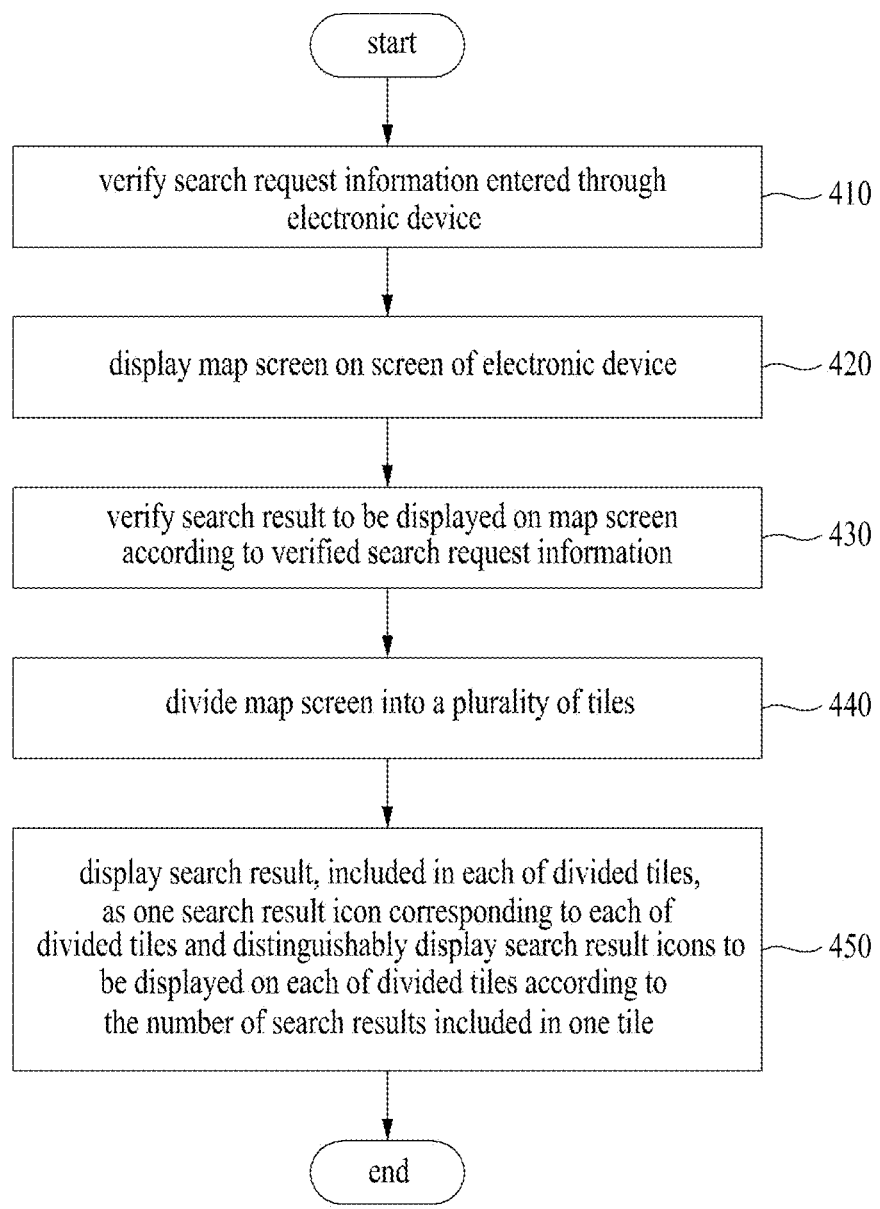
FIG. 4 is a flowchart illustrating a nearby search method according to an exemplary embodiment of the inventive concept.

FIG. 3 is a block diagram illustrating a detailed configuration of a nearby search system according to an exemplary embodiment of the inventive concept. FIG. 4 is a flowchart illustrating a nearby search method according to an exemplary embodiment of the inventive concept. The nearby search system according to an exemplary embodiment of the inventive concept may correspond to an electronic device 110 shown in FIG. 2. FIG. 3 illustrates an example in which a processor 220 includes a search request information verifying unit 310, a map screen display unit 320, a search result verifying unit 330, a map screen dividing unit 340, and a search result icon display unit 350. These components may be implemented to execute steps 410 to 450 included in the nearby search method of FIG. 4 through an OS and at least one program code which are stored in a memory 210 of FIG. 2.

In step 410, the search request information verifying unit 310 may verify search request information entered through an electronic device. Herein, the electronic device may correspond to the electronic device 110. The electronic device may provide a user interface, which may receive search request information, to its user. For example, the electronic device may provide a user interface in which the user may enter a keyword as search request information. In this case, the search request information verifying unit 310 may verify the keyword, entered through the user interface, as the search request information.

In step 420, the map screen display unit 320 may display a map screen on a screen of the electronic device. The map screen may be associated with a current position of the electronic device and may be associated with search request information entered by the user. For example, the map screen display unit 320 may display a map screen about a current position of the electronic device on a screen of the electronic device or may display a map screen about a position, selected according to a keyword entered by the user, on the screen of the electronic device. In other words, a nearby search system may provide a service for searching for an area around a current position or may provide a service for searching for an area around a specific position the user wants.

The map screen display unit 320 may download a necessary map screen in real time through a server 150 or 160 of FIG. 2 and may display the downloaded map screen on the screen of the electronic device. Alternatively, the map screen display unit 320 may download and store a necessary map screen in advance through the server 150 or 160 and may load and display the stored map screen at a necessary time on the screen of the electronic device.

In step 430, the search result verifying unit 330 may verify a search result to be displayed on the map screen according to the verified search request information. The search request information may include information such that the user specifies a search result to perform a nearby search. The above-mentioned keyword may be also an example of information for specifying a search result. A category, such as a business type, may be also an example of information for specifying a search result.

In this case, data to be provided as the search result may be stored and managed in a database (DB). The DB may be implemented and stored in the server 150 or 160 described with reference to FIG. 2. In this case, the search result verifying unit 330 may connect to the server 150 or 160 through a network 170 of FIG. 2 and may transmit the search request information to the server 150 or 160. The server 150 or 160 may extract a search result corresponding to the search request information from the DB and may transmit the search result to the electronic device.

In another exemplary embodiment of the inventive concept, the DB may be implemented in the electronic device. For example, the electronic device may receive data, necessary for a search, in advance from the server 150 or 160 and may construct the DB. In this case, the search result verifying unit 330 may extract a search result corresponding to search request information from the DB constructed in the electronic device.

In step 440, the map screen dividing unit 340 may divide a map screen into a plurality of tiles. For example, the map screen dividing unit 340 may divide the map screen displayed on the screen of the electronic device into the plurality of tiles according to latitude and longitude coordinates. This map screen may be virtually divided not to be displayed on the screen of the electronic device. Each of regions partitioned according to the division of the map screen may be defined as a tile. These tiles may have the same size as each other. The sizes of the tiles may be changed according to a scale of the map screen or may be set to be identical always irrespective of the scale of the map screen.

In an exemplary embodiment of the inventive concept, the sizes of the tiles may correspond to a constant area always shown on the map screen. For example, regions may be previously divided as a grid shape every latitude n degrees (n is a positive rational number) and longitude m degrees (m is a negative rational number) of a map. In this case, the map screen dividing unit 340 may divide the map screen into a plurality of tiles through matching between the regions previously divided in step 440 and regions of the map screen. In this case, since one tile corresponds to the same size of the map screen always, a size (e.g., the size is not displayed on the map screen) of a tile on the map screen may be changed according to a current scale of the map screen. In this case, the number of search results included in the same tile may be identical to each other irrespective of a change of a scale of the map screen.

In another exemplary embodiment of the inventive concept, a size of each of tiles may be determined according to a size (or resolution) of a display of the electronic device 110. For example, a display screen may be previously divided into a plurality of regions (e.g., a grid shape) according to the size of the display of the electronic device 110. In this case, in step 440, the map screen dividing unit 340 may divide tiles on a map screen displayed on a current screen of the electronic device through matching between regions of the map screen and the previously divided regions of the display screen. In this case, when a scale of the map screen is changed, an area of the map screen, matched with one tile, may be changed. Therefore, the number of search results included in the same tile may be changed according to a scale of the map screen.

In step 450, the search result icon display unit 350 may display search results, included in each of the divided tiles, as one search result icon corresponding to each of the divided tiles and may distinguishably display search result icons to be displayed on each of the divided tiles according to the number of research results included in one tile.

In this case, the search result icon display unit 350 may reduce complexity as a plurality of search results are displayed on the map screen by displaying a plurality of search results, included in one tile, as one search result icon irrespective of the number of the plurality of search results. Since search result icons displayed according to the number of search results are distinguished from each other, users may intuitively recognize regions (tiles) including a number of search results. For example, when five search results are included in a first tile and when 10 search results are included in a second tile, a search result icon to be displayed on the first tile and a search result icon to be displayed on the second tile may be distinguishably displayed. If search result icons are distinguishably displayed, when the number of search results included in a tile is more increased, such that a size of a corresponding search result icon becomes bigger, a size of a search result icon displayed on the second tile may be bigger than that of a search result icon displayed on the first tile. Therefore, the user may recognize at a glance that more search results are included in a region of the second tile.

There may be various methods of distinguishably displaying search result icons. For example, as described above, the method of distinguishably displaying search result icons, when the number of search results included in one tile is increased, such that a size of a corresponding search result icon becomes bigger, may be one of the various methods.

Also, in comparison with differently determining a size of a search result icon per the number of search results, a device may previously set and use a plurality of grades for search result icons according to a range of the number of search results. For example, when the number of search results included in one tile is 1, a "c" grade may be preset. When the number of search results included in one tile is 2 to 40, a "b" grade may be preset. When the number of search results included in one tile is greater than or equal to 41, an "a" grade may be preset. Search result icons may be distinguishably displayed such that a search result icon of the "b" grade is displayed to be bigger than a search result icon of the "c" grade and such that a search result icon of the "a" grade is displayed to be bigger than a search result icon of the "b" grade. A range of the number of grades and the number of search results may be preset in various ways.

Figure 5:
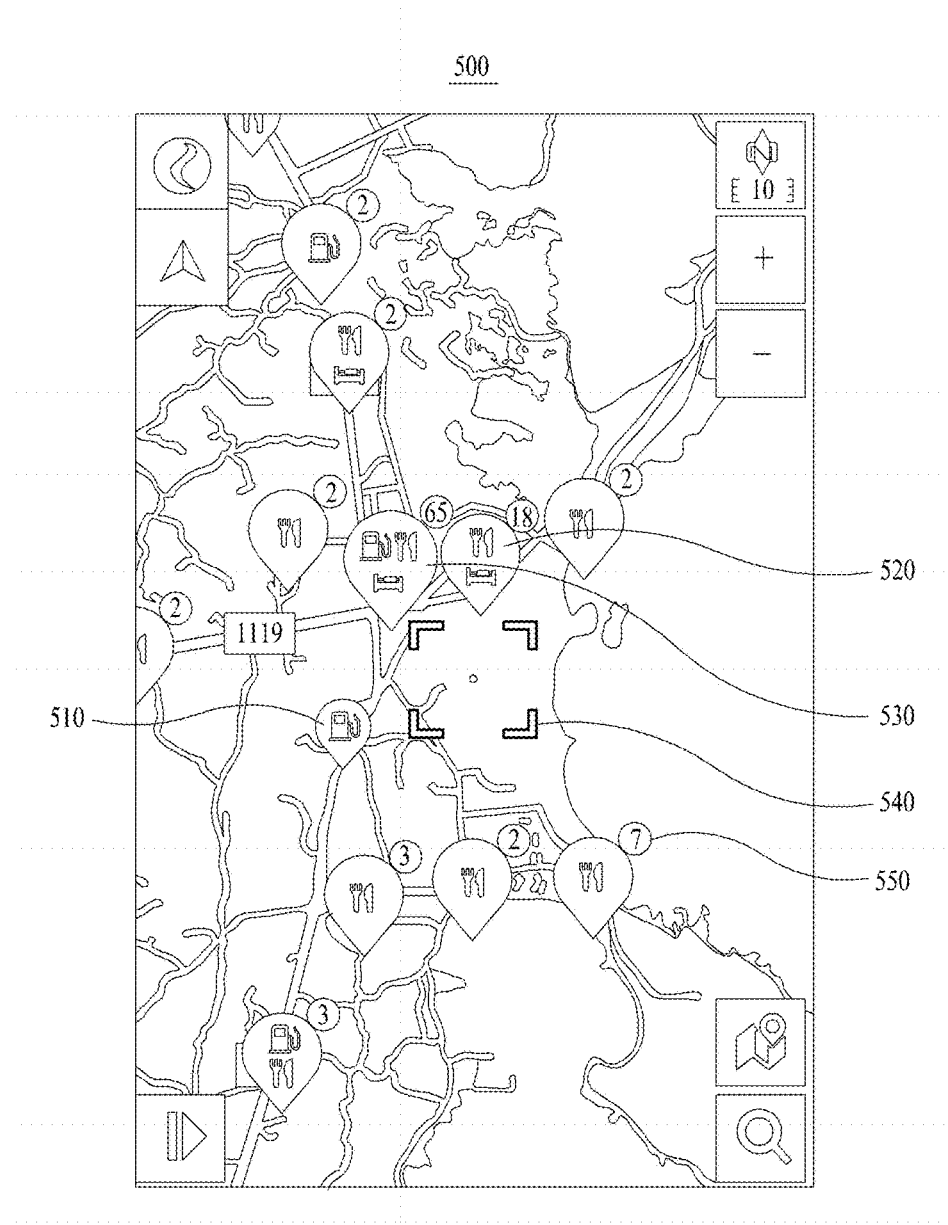
FIG. 5 is a drawing illustrating a map screen which displays a search result icon according to an exemplary embodiment of the inventive concept.

FIG. 5 is a drawing illustrating a map screen which displays a search result icon according to an exemplary embodiment of the inventive concept. FIG. 5 illustrates an example in which a map screen 500 displays a plurality of search result icons. A nearby search system may divide the map screen 500 into a plurality of tiles, may measure density (the number of search results) of search results in a corresponding region on each of the tiles, and may display search results in one tile (one region) as one search result icon.

In this case, as shown in FIG. 5, at least one of search result icons may include an indicator (e.g., a first indicator 550) indicating the number of search results included in a corresponding tile. The number '7' indicated by the first indicator 550 may indicate that 7 search results are included in a tile corresponding to corresponding search result icons. FIG. 5 illustrates an example in which an indicator is included in only a search result icon corresponding to a tile including a plurality of search results.

The user may know that a first search result icon 510, a second search result icon 520, and a third search result icon 530, which are displayed on the map screen 500, are different from each other in size. In an example of the above-mentioned a, b and c grades, because of corresponding to one search result, the first search result icon 510 may be set to the "c" grade. Because of corresponding to 18 search results, the second search result icon 520 may be set to the "b" grade. Because of corresponding to 65 search results, the third search result icon 530 may be set to the "a" grade. The user may know that sizes of the first to third search result icons 510, 520 and 530 may be gradually bigger in the order of the "c" grade, the "b" grade, and the "a" grade.

In this case, the user may intuitively ascertain that many search results are concentrated in a region on which the third search result icon 530 is displayed.

A selection user interface 540 may be a user interface for selecting a search result icon. For example, when the map screen 500 is displayed on a display of a touch screen environment, a touch & drag event of a user on the map screen 500 may cause movement of a map. In this case, the selection user interface 540 may be fixed and displayed on a central position of a screen. In this case, when the user moves the map such that one search result icon is located on a display region of the selection user interface 540, information about search results included in a corresponding search result icon may be provided.

For example, a new map screen in which a map for a region of a corresponding tile is expanded may be configured and displayed on the screen. For example, when the map moves such that the third search result icon 530 is located on a display region of the selection user interface 540, the nearby search system may automatically configure a new map screen for a region of a tile corresponding to the third search result icon 530 and may display the configured new map screen on the screen. In this case, 65 search results corresponding to the third search result icon 530 may be displayed on the new map screen.

Figure 6:
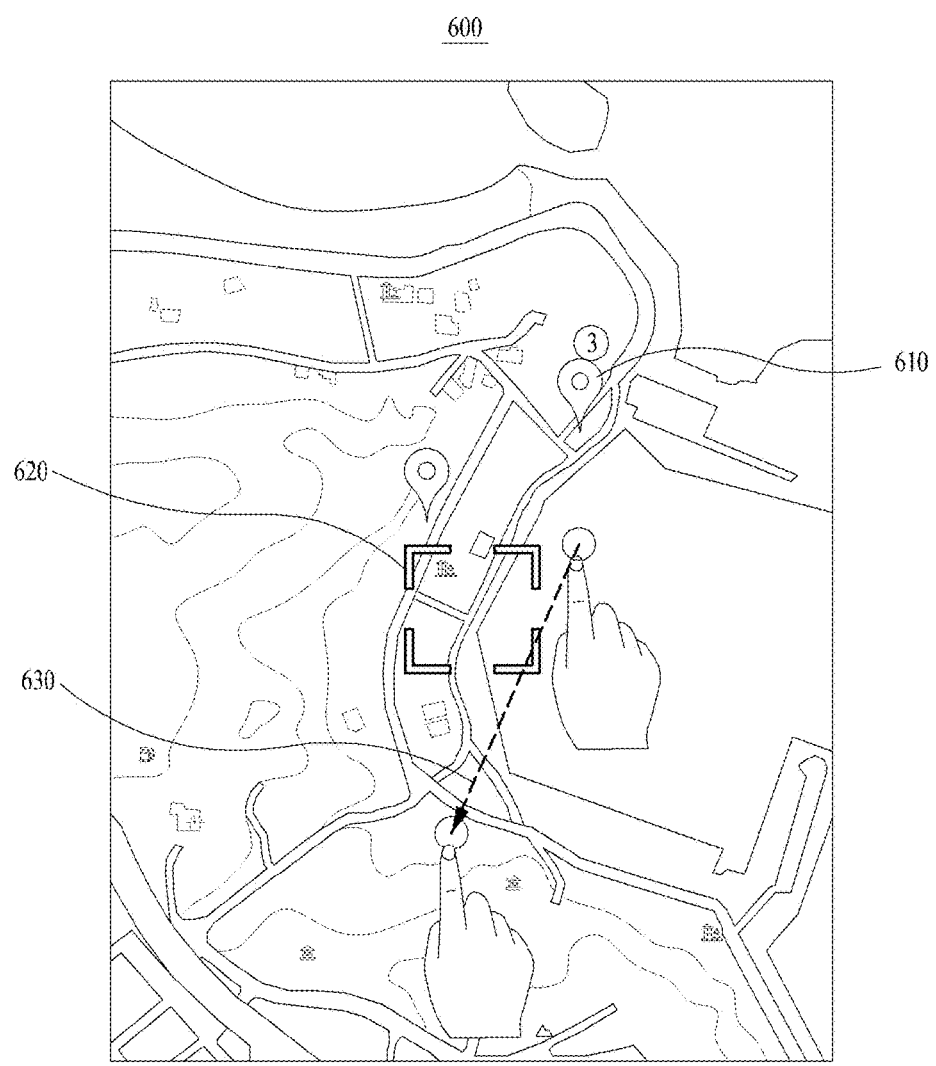
FIGS. 6, 7 and 8 are drawings illustrating a process of moving a map and selecting a search result icon according to an exemplary embodiment of the inventive concept.
Figure 7:
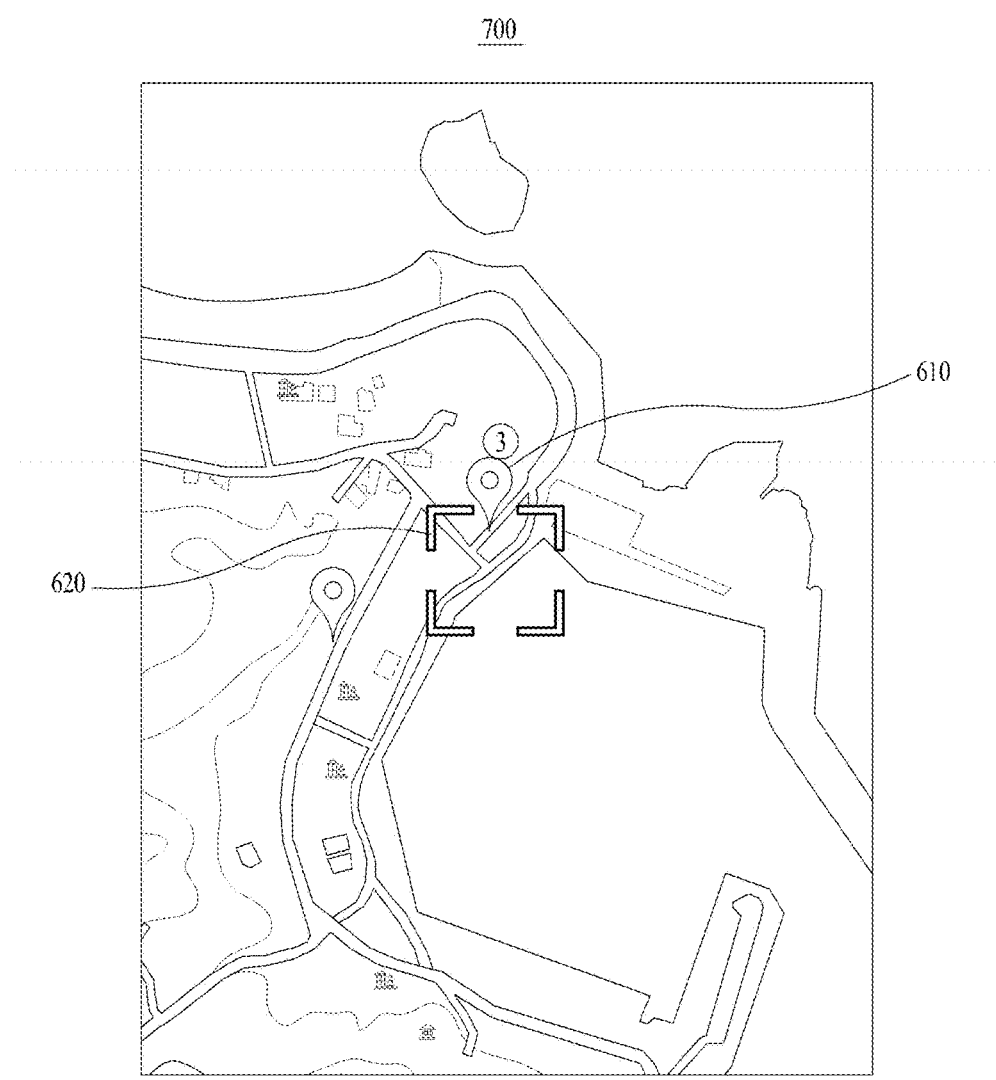
Figure 8:
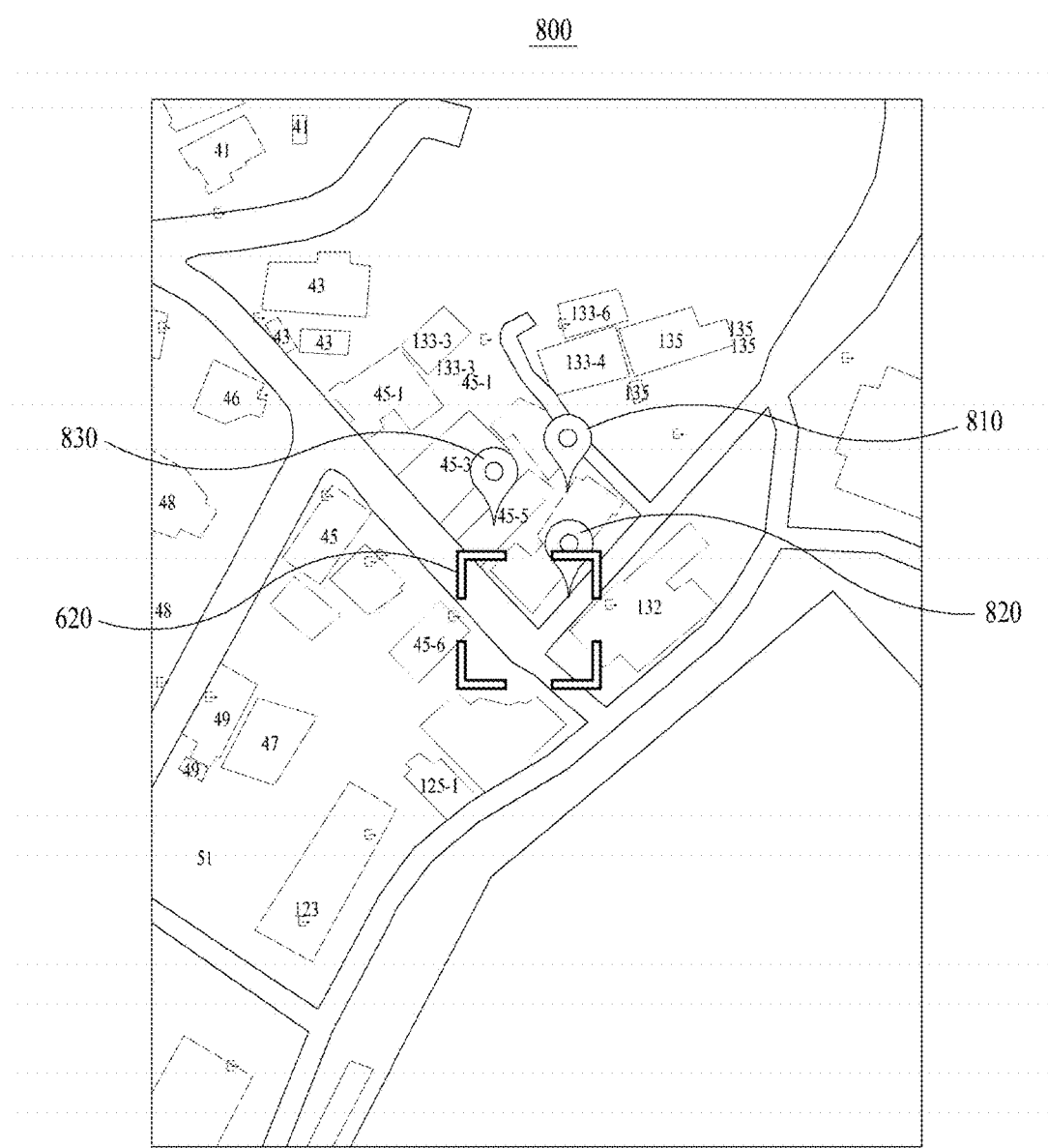

FIGS. 6, 7 and 8 are drawings illustrating a process of moving a map and selecting a search result icon according to an exemplary embodiment of the inventive concept.

FIG. 6 illustrates an example in which a screen 600 displays two search result icons including a first search result icon 610 and a selection user interface 620. A user may touch and drag a map in the direction indicated by an arrow 630 to see search results corresponding to the first search result icon 610.

In this case, as shown in a screen 700 of FIG. 7, as the map is moved, the first search result icon 610 is moved within a region of the selection user interface 620. That the first search result icon 610 is moved within the region of the selection user interface 620 may refer to that a position (e.g., a central position of a corresponding tile) indicated by the first search result icon 610 is moved within the region of the selection user interface 620.

In this case, a nearby search system may expand the map automatically (without user interaction) to provide information about three search results.

FIG. 8 illustrates an example in which a screen 800 displays three search result icons 810, 820 and 830 corresponding to the three search results included in the first search result icon 610 as the map is expanded on the screen 700 of FIG. 7.

Also, in this case, a new map screen may be divided into a plurality of tiles, and search results included in each of the plurality of tiles may be displayed as one search result icon.

Figure 9:
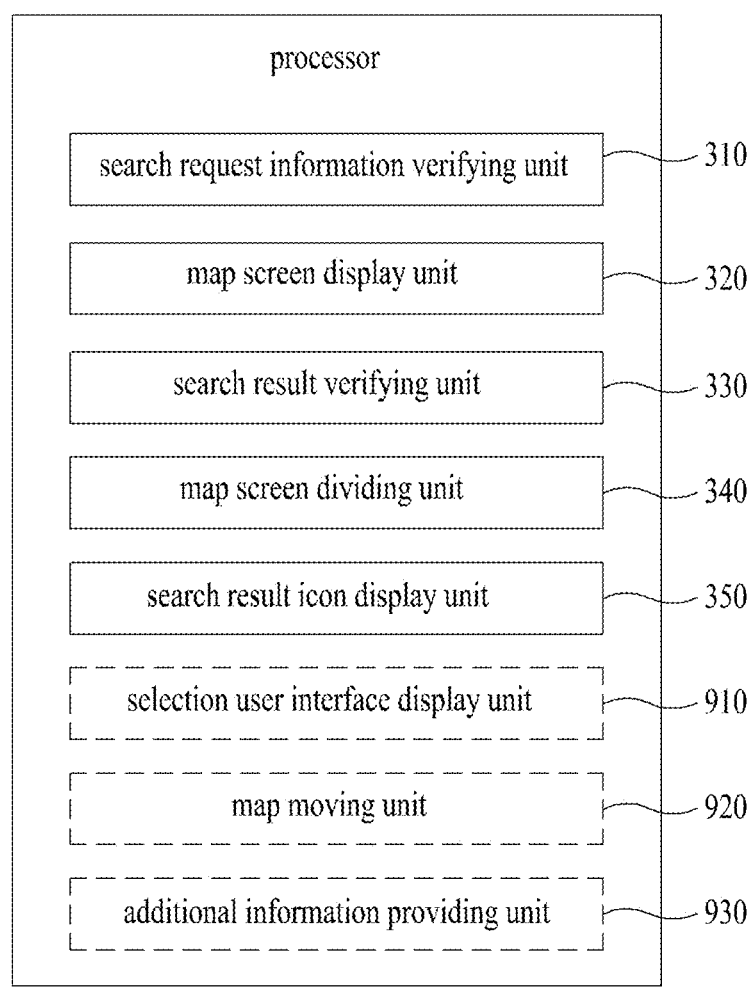
FIG. 9 is a block diagram illustrating a detailed configuration of a nearby search system according to another exemplary embodiment of the inventive concept.
Figure 10:
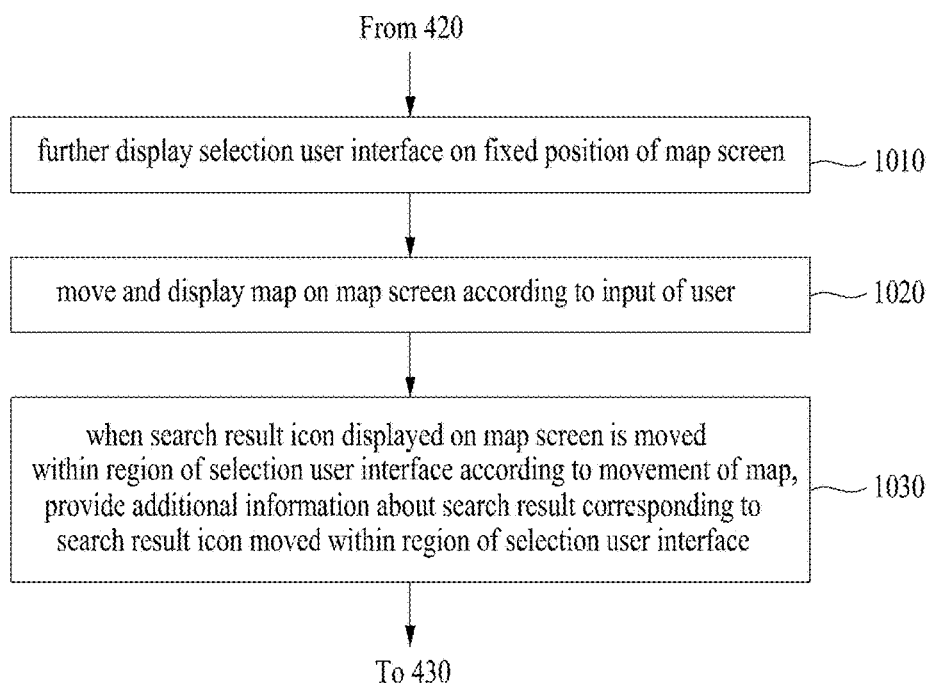
FIG. 10 is a flowchart illustrating a nearby search method according to another exemplary embodiment of the inventive concept.

FIG. 9 is a block diagram illustrating a detailed configuration of a nearby search system according to another exemplary embodiment of the inventive concept. FIG. 10 is a flowchart illustrating a nearby search method according to another exemplary embodiment of the inventive concept. The nearby search system according to another exemplary embodiment of the inventive concept may correspond to an electronic device 110 described with reference to FIG. 2. The nearby search system may be implemented to include a search request information verifying unit 310, a map screen display unit 320, a search result verifying unit 330, a map screen dividing unit 340, and a search result icon display unit 350, included in a processor 220 shown in FIG. 3, and may further include a selection user interface display unit 910, a map moving unit 920, and an additional information providing unit 930.

In this case, the selection user interface display unit 910, the map moving unit 920, and the additional information providing unit 930 may be implemented to execute steps 1010, 1020 and 1030 of FIG. 10 through an operating system (OS) and at least one program code which are stored in a memory 210 of FIG. 2.

In step 1010, the selection user interface display unit 910 may further display a selection user interface on a fixed position of a map screen. Step 1010 may be performed after or together with a map screen is displayed in step 420 of FIG. 4.

In step 1020, the map moving unit 920 may move and display a map on the map screen according to an input of a user. Step 1020 may be performed when an input (e.g., a touch and drag input on the map screen) of the user occurs after step 1010.

In step 1030, when a search result icon displayed on the map screen is moved within a region of a selection user interface according to the movement of the map, the additional information providing unit 930 may provide additional information about a search result corresponding to the search result icon moved within the region of the selection user interface. The additional information about the search result may be provided as a list shape and the like. However, as described with reference to FIG. 8, as a map is expanded, the additional information for the search result may be provided.

Figure 11:
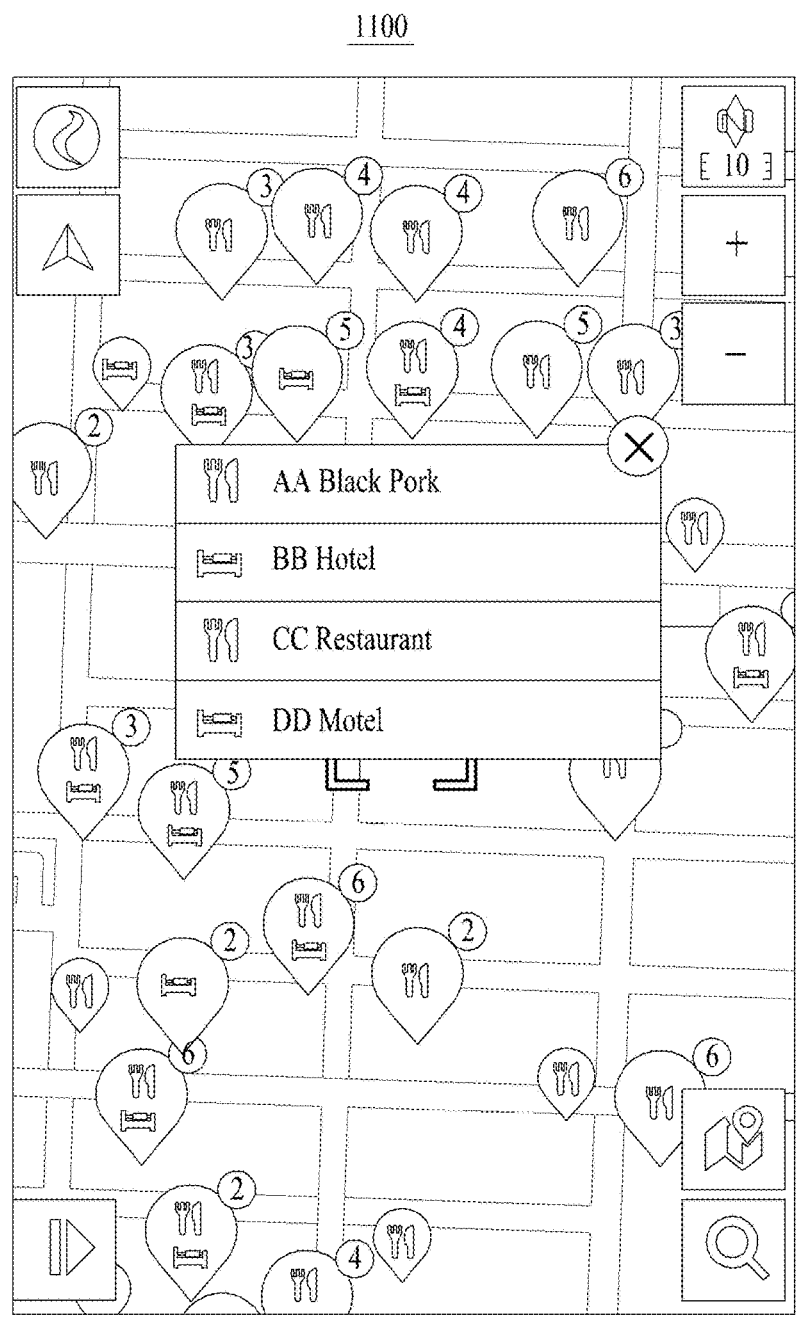
FIG. 11 is a drawing illustrating a process of providing additional information according to an exemplary embodiment of the inventive concept.

FIG. 11 is a drawing illustrating a process of providing additional information according to an exemplary embodiment of the inventive concept. FIG. 11 illustrates an example in which when a search result icon is moved within a region of a selection user interface, a screen 1100 displays additional information, about a search result corresponding to the search result icon, as a list form. In this case, a link to a detailed information page of a corresponding search result may be set in separate information of a list.

According to exemplary embodiments of the inventive concept, a nearby search system may provide a nearby search service to reduce complexity on a map screen by displaying search results, included in one region (a region divided into one tile), as one search result icon, although a plurality of search results are included in one map screen. Also, the nearby search system may provide a nearby search service such that users may intuitively obtain information about the number of search results by distinguishably displaying search result icons according to the number of search results. Also, the nearby search system may allow users to conveniently select a search result by allowing them to obtain additional information about search results included in a search result icon only when they moves a map.

The above-mentioned search results may be classified and managed according to N categories. Herein, N may be a natural number of 2 or more. A search request information verifying unit 310 described with reference to FIG. 3 may provide a user interface, which may select M (M is a natural number of N or less) of N categories, to an electronic device and may verify search request information including the M categories selected through the user interface.

Figure 12:
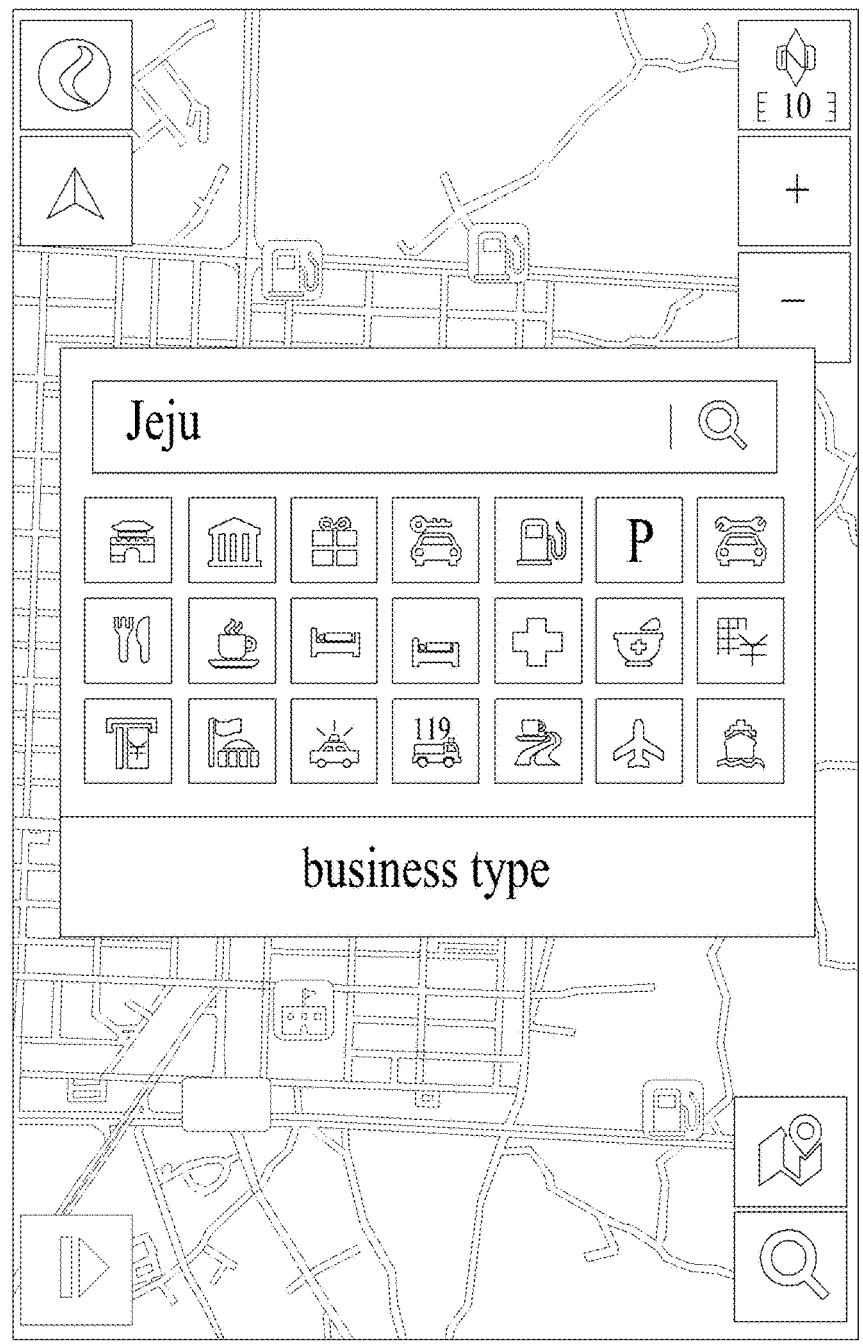
FIG. 12 is a drawing illustrating a user interface which may select a category according to an exemplary embodiment of the inventive concept.

FIG. 12 is a drawing illustrating a user interface which may select a category according to an exemplary embodiment of the inventive concept. FIG. 12 illustrates an example in which a user selects three of 21 categories which are preset for a business type and enters a keyword "Jeju" through a user interface on a screen 1200.

For example, it may be assumed that the user fills up his or her car at a gas station, has a meal in a restaurant, and then wants to look for accommodates. In this case, as shown in FIG. 12, the user may look for a search result by entering a desired business type once without the necessity of successively looking for the gas station, the restaurant, and the accommodations.

Also, referring again to FIG. 5, a plurality of category icons refer to that all of a gas station, a restaurant, and accommodations are included in a third search result icon 530.

For this purpose, search request information may include a plurality of categories selected through a user interface. A search result verifying unit 330 of FIG. 3 may verify a search result corresponding to each of the plurality of selected categories.

In an exemplary embodiment of the inventive concept, when search results included in one tile correspond to a plurality of categories, a plurality of category icons corresponding to the plurality of categories may be included in a search result icon corresponding to the one tile. FIG. 5 illustrates an example in which a plurality of category icons corresponding to a plurality of categories are included in the search result icon 530 corresponding to one tile.

In another exemplary embodiment of the inventive concept, when categories of search results included in one tile are different from each other, category icons of a category having relatively more search results of the same category may be included in a search result icon corresponding to one tile. For example, when the most search results for a restaurant are preset among search results corresponding to the third search result icon 530, only a category icon corresponding to the restaurant may be included in the third search result icon 530.

Also, search request information may further include a keyword entered by the user. In this case, the search result verifying unit 330 may verify a search result through a joint search using a plurality of selected categories and a keyword. For example, the search result verifying unit 330 may verify a search result by searching for "accommodates of Jeju-si" through a joint search between a keyword "Jeju-si" and a business type "accommodates".

Figure 13:
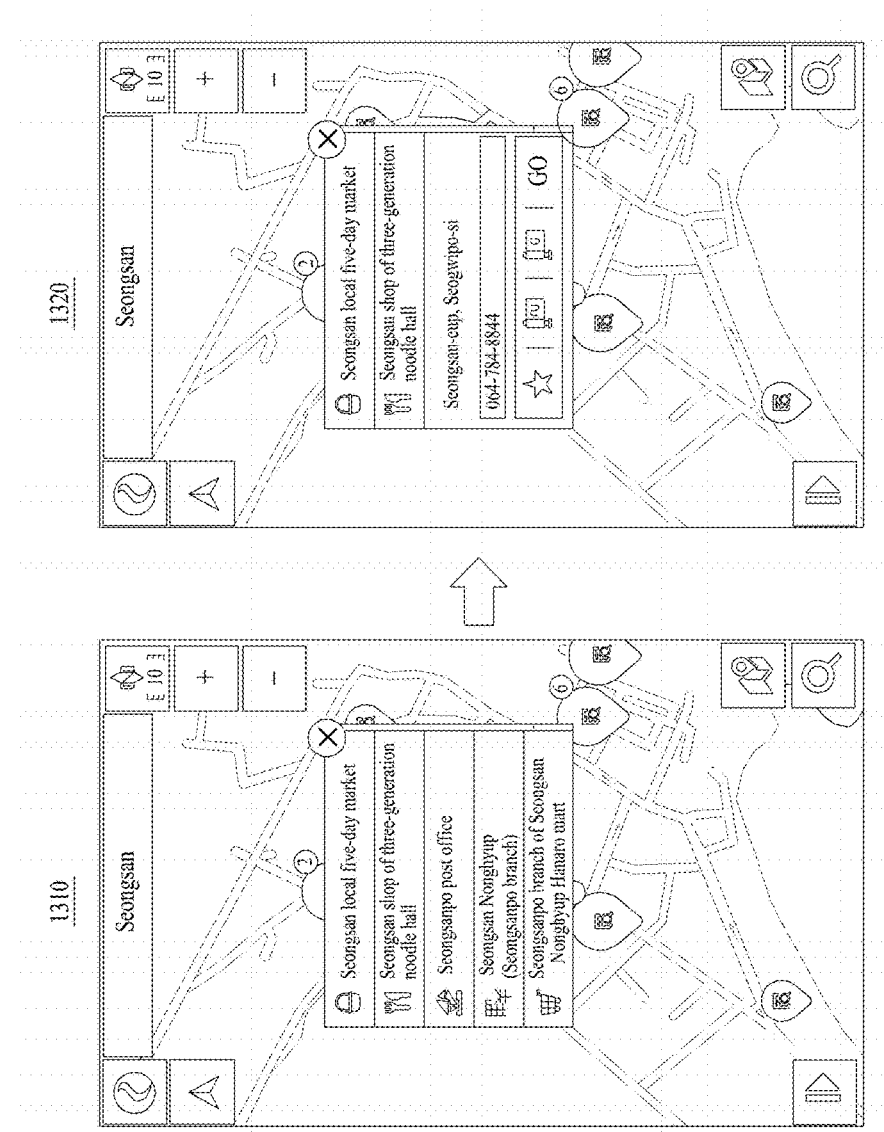
FIG. 13 is a flowchart illustrating a business result according to a title search according to an exemplary embodiment of the inventive concept.

FIG. 13 is a flowchart illustrating a business result according to a title search according to an exemplary embodiment of the inventive concept. FIG. 13 illustrates an example in which a first screen 1310 displays a list of various business types which have titles including a keyword "Seongsan" as a user enters the keyword "Seongsan". Also, FIG. 13 illustrates an example in which a second screen 1320 displays detailed information about a corresponding search result as the user selects one (e.g., "three-generation noodle hall Seongsan shop") of search results of the list.

As such, a nearby search system may perform a joint search between a title and a business type (category) through a point of interest (POI) clustering scheme and may obtain information classified about a business type through a title.

Also, the nearby search system may use visit history collected by a server 150 or 160. For example, a device may store visit history, in which a plurality of electronic devices including an electronic device visit a position corresponding to a search result, in the server 150 or 160. The server 150 or 160 may generate and store visit history for whether users visit any positions according to position information of them.

In this case, a search result icon display unit 350 of FIG. 3 may receive the visit history for the search result from the server 150 or 160 and may display a search result icon corresponding to a tile including a search result in which a value according to the visit history is greater than or equal to a predetermined value to be distinguished from other search result icons. For example, the search result icon display unit 350 may differently display a color, a size, or a shape, and the like of a search result icon with respect to a search result, users frequently visit, to inform them that the corresponding search result is popular with them. In the related art, search results, users frequently search for, or reviews of users, such as power bloggers, who have lots of influence on others are used. However, according to an exemplary embodiment of the inventive concept, the nearby search system may display search results users actually and frequently visit to be distinguished from other search results to provide search results of higher quality.

As such, according to exemplary embodiments of the inventive concept, users may verify density at a glance due to a display to which a POI clustering scheme is applied and may select overlapped POI. Also, the nearby search system may meet various purposes of users by providing various business type searches (e.g., 3 business type searches) once. The nearby search system may provide convenience to users by automatically performing a search when they move a map in a state where a nearby search is performed.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller.

Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A nearby search method implemented with a computer, comprising:
   verifying a search request entered through an electronic device, the search request including a plurality of selected categories;
   displaying a map screen including a geological map on a screen of the electronic device;
   verifying a search result comprising the plurality of selected categories to be displayed on the map screen according to the verified search request by using a join search of the plurality of selected categories, the search result including at least one Point Of Interest (POI) on the geological map;

virtually dividing the map screen into a plurality of tiles, the search result being associated with at least one tile of the plurality of tiles based on a location of the at least one POI on the geological map; and displaying, on the at least one tile, a search result icon associated with the search result, wherein the at least one POI included in the at least one tile with the search result icon is associated with the plurality of selected categories, and a category icon of a category with a greater number of POIs among the plurality of selected categories is included as the search result icon.

2. The nearby search method of claim 1, wherein the displaying of the search result icon comprises:

displaying a bigger search result icon as a number of POIs included in the at least one tile associated with the search result icon increases.

3. The nearby search method of claim 1, further comprising:

previously setting a plurality of grades for the search result icon according to a range of a number of POIs included in the at least one tile associated with the search result icon, wherein the displaying of the search result icon comprises:

displaying a bigger search result icon as the search result icon has a higher grade.

4. The nearby search method of claim 1, wherein the search result icon comprises an indicator indicating a number of POIs included in the at least one tile associated with the search result icon.

5. The nearby search method of claim 1, further comprising:

further displaying a selection user interface on a fixed position of the map screen;

moving and displaying the geological map on the map screen according to an input of the user; and when the search result icon displayed on the map screen is moved within a region of the selection user interface according to the movement of the map, providing additional information about the search result corresponding to the search result icon moved within the region of the selection user interface.

6. The nearby search method of claim 1, wherein when the at least one POI included in the at least one tile associated with the search result icon is associated with the plurality of selected categories, a plurality of category icons corresponding to the plurality of selected categories is included in the search result icon.

7. The nearby search method of claim 1, wherein the displaying of the search result icon comprises:

receiving a visit history for the at least one POI of the search result from a server storing the visit history, in which a plurality of electronic devices including the electronic device visited a position corresponding to the at least one POI of the search result; and displaying the search result icon with the at least one POI in which a value according to the visit history is greater than or equal to a predetermined value to be distinguished from other search result icons.

8. A non-transitory computer-readable storage medium storing a program that when executed by a computer processor performs steps comprising:

verifying a search request entered through an electronic device, the search request including a plurality of selected categories;

displaying a map screen including a geological map on a screen of the electronic device;

verifying a search result comprising the plurality of selected categories to be displayed on the map screen according to the verified search request by using a join search of the plurality of selected categories, the search result including at least one Point Of Interest (POI) on the geological map;

virtually dividing the map screen into a plurality of tiles, the search result being associated with at least one tile of the plurality of tiles based on a location of the at least one POI on the geological map; and displaying, on the at least one tile, a search result icon associated with the search result, wherein the at least one POI included in the at least one tile with the search result icon is associated with the plurality of selected categories, and a category icon of a category with a greater number of POIs among the plurality of selected categories is included as the search result icon.

9. A nearby search system, comprising:

a hardware memory configured to store computer-readable instructions; and one or more processors configured to execute the computer-readable instructions, wherein each of the one or more processors comprises:

a search request information verifying unit configured to verily a search request entered through an electronic device, the search request including a plurality of selected categories;

a map screen display unit configured to display a map screen including a geological map on a screen of the electronic device;

a search result verifying unit configured to verify a search result comprising the plurality of selected categories to be displayed on the map screen according to the verified search request by using a join search of the plurality of selected categories, the search result including at least one Point Of Interest (POI) on the geological map;

a map screen dividing unit configured to virtually divide the map screen into a plurality of tiles, the search result being associated with at least one tile of the plurality of tiles based on a location of the at least one POI on the geological map; and a search result icon display unit configured to display, on the at least one tile, a search result icon associated with the search result, wherein the at least one POI included in the at least one tile with the search result icon is associated with the plurality of selected categories, and a category icon of a category with a greater number of POIs among the plurality of selected categories is included as the search result icon.

10. The nearby search system of claim 9, wherein the search result icon display unit displays a bigger search result icon as a number of POIs included in the at least one tile associated with the search result icon increases.

11. The nearby search system of claim 9, further comprising:

a device configured to previously set a plurality of grades for the search result icon according to a range of a number of POIs included in the at least one tile associated with the search result icon, wherein the search result icon display unit displays a bigger search result icon as the search result icon has a higher grade.

12. The nearby search system of claim 9, wherein the search result icon comprises an indicator indicating a number of POIs included in the at least one tile associated with the search result icon.

13. The nearby search system of claim 9, further comprising:
- a selection user interface display unit configured to further display a selection user interface on a fixed position of the map screen;
- a map moving unit configured to move and display the geological map on the map screen according to an input of the user; and
- when a search result icon displayed on the map screen is moved within a region of the selection user interface according to the movement of the map, an additional information providing unit configured to provide additional information about the search result corresponding to the search result icon moved within the region of the selection user interface.

14. The nearby search system of claim 9, wherein when a least one POI included in the at least one tile associated with the search result icon is associated with the plurality of selected categories, a plurality of category icons corresponding to the plurality of selected categories is included in the search result icon.

15. The nearby search system of claim 9, wherein the search result icon display unit receives a visit history for the at least one POI of the search result from a server storing the visit history, in which a plurality of electronic devices including the electronic device visited a position corresponding to the at least one POI of the search result, and displays the search result icon with the at least one POI in which a value according to the visit history is greater than or equal to a predetermined value to be distinguished from other search result icons.

* * * * *